(12) United States Patent
Johnson et al.

(10) Patent No.: US 10,621,342 B2
(45) Date of Patent: Apr. 14, 2020

(54) SPECULATIVE SIDE CHANNEL ATTACK MITIGATION USING UNCACHEABLE MEMORY

(71) Applicant: MICROSOFT TECHNOLOGY LICENSING, LLC, Redmond, WA (US)

(72) Inventors: Kenneth D. Johnson, Seattle, WA (US); Sai Ganesh Ramachandran, Redmond, WA (US); Xin David Zhang, Redmond, WA (US); Arun Upadhyaya Kishan, Kirkland, WA (US); David Alan Hepkin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 15/801,649

(22) Filed: Nov. 2, 2017

(65) Prior Publication Data

US 2019/0130102 A1    May 2, 2019

(51) Int. Cl.
*G06F 21/55* (2013.01)
*G06F 12/1009* (2016.01)
(Continued)

(52) U.S. Cl.
CPC ........ *G06F 21/556* (2013.01); *G06F 9/45558* (2013.01); *G06F 12/1009* (2013.01); *G06F 12/1045* (2013.01); *G06F 12/145* (2013.01); *G06F 21/6281* (2013.01); *G06F 2009/45579* (2013.01); *G06F 2009/45583* (2013.01); *G06F 2212/1052* (2013.01);
(Continued)

(58) Field of Classification Search
CPC . G06F 12/145; G06F 12/1009; G06F 12/1045
USPC ......................................................... 726/23
See application file for complete search history.

(56) References Cited

U.S. PATENT DOCUMENTS 10,394,595 B2 * 8/2019 Neiger ................ G06F 12/1425
10,445,009 B2 * 10/2019 Whaley ................. G06F 3/0683
(Continued)

*Primary Examiner* — Shin-Hon (Eric) Chen
*Assistant Examiner* — Dereena T Cattungal
(74) *Attorney, Agent, or Firm* — Workman Nydegger

(57) ABSTRACT

Speculative side channels exist when memory is accessed by speculatively-executed processor instructions. Embodiments use uncacheable memory mappings to close speculative side channels that could allow an unprivileged execution context to access a privileged execution context's memory. Based on allocation of memory location(s) to the unprivileged execution context, embodiments map these memory location(s) as uncacheable within first page table(s) corresponding to the privileged execution context, but map those same memory locations as cacheable within second page table(s) corresponding to the unprivileged execution context. This prevents a processor from carrying out speculative execution of instruction(s) from the privileged execution context that access any of this memory allocated to the unprivileged execution context, due to the unprivileged execution context's memory being mapped as uncacheable for the privileged execution context. Performance for the unprivileged execution context is substantially unaffected, however, since this memory is mapped as cacheable for the unprivileged execution context.

17 Claims, 5 Drawing Sheets

(51) Int. Cl.
*G06F 12/1045* (2016.01)
*G06F 12/14* (2006.01)
*G06F 9/455* (2018.01)
*G06F 21/62* (2013.01)

(52) U.S. Cl.
CPC .... *G06F 2212/152* (2013.01); *G06F 2212/60* (2013.01); *G06F 2212/657* (2013.01); *G06F 2212/68* (2013.01); *G06F 2221/034* (2013.01)

(56) References Cited

U.S. PATENT DOCUMENTS

| | | | |
|---|---|---|---|
| 2015/0095590 A1* | 4/2015 | Lu | G06F 12/10 |
| | | | 711/146 |
| 2017/0083340 A1* | 3/2017 | Burger | G06F 9/268 |
| 2019/0004961 A1* | 1/2019 | Boggs | G06F 12/0875 |

* cited by examiner

SPECULATIVE SIDE CHANNEL ATTACK MITIGATION USING UNCACHEABLE MEMORY

BACKGROUND

In computing, "side channel attacks" are a class of techniques used to leak information about a sensitive computation through externally visible side effects of performance of that computation. Through targeted analysis, these externally visible side effects may encode information about a sensitive value. In the context of cryptography, for example, memory access patterns made by privileged software performing a cryptographic operation may vary based on a secret cryptographic key's value. Thus, the latency of subsequent memory operations—which are observable to unprivileged software—may encode information about secret key values used by the privileged software as index into lookup tables or substitution boxes that are common to many cryptographic algorithms. Since side channel attacks have been considered a serious issue for cryptographic software, mitigations have been crafted, such as careful tailoring of cryptographic operations to be constant time with respect to any sensitive key material.

Side channel attacks are also possible within other domains. For example, a "speculative" side channel attack may leak arbitrary sensitive data by utilizing observable side effects resulting from the speculative out-of-order instruction execution designs used by modern high-performance processors. In particular, speculative side channel attacks may leverage timing artifacts of a processor's speculative execution hardware in order to leak secret memory content used by privileged software designed to protect such secret memory content (e.g., an operating system, a hypervisor, etc.).

One example of a speculative side channel includes an instruction execution sequence that speculatively, during an out-of-order instruction execution flow, issues a load from a privileged memory location containing a secret, and then accesses additional unprivileged-accessible cache lines using the contents from the first load as an index. While the computations performed during this speculative execution flow would eventually be rolled back by the out-of-order machine if it is later determined that they were mispredicted, the side effects of these computations (e.g., the cache lines accessed using sensitive memory contents as an index) are still externally visible to unprivileged software by measuring such things as memory latency after any mispredicted instructions have been cancelled.

Various techniques exist for unprivileged software to cause a mispredicted speculative execution flow by privileged software. For example, during execution of privileged software, unprivileged software may cause an out-of-order machine to execute a mispredicted speculative execution flow in the privileged software (e.g., by setting up a branch target buffer with specially-crafted entries), and then observe side-effects of that mispredicted speculative execution flow. Techniques also exist for unprivileged software to extend the length of time for the misprediction to be resolved, thereby increasing the chance that useful data can be leaked from the predicted out-of-order instruction flow is canceled by the out-of-order machine.

BRIEF SUMMARY

At least some embodiments described herein use "uncacheable" memory mappings to close speculative side channels that could allow an unprivileged execution context to access a privileged execution context's memory. As used herein, an unprivileged execution context can include any execution context that should not have access to the privileged execution context's memory, regardless of its actual privilege level. In particular, after allocating memory to an unprivileged execution context, embodiments map memory locations allocated to this execution context as uncacheable within first page table(s) corresponding to the privileged execution context. However, the embodiments map those same memory locations as "cacheable" within second page table(s) corresponding to the unprivileged execution context.

In general, processors will not carry out a speculative memory access if the access is to uncacheable memory. Thus, the foregoing mappings prevent a processor from carrying out speculative execution of instruction(s) within the privileged execution context, if those instruction(s) access any of the unprivileged execution context's memory (i.e., because this execution context's memory is mapped as uncacheable for the privileged execution context). However, embodiments retain the performance benefits afforded by memory caching for the unprivileged execution context, since the unprivileged execution context's memory is mapped as cacheable for the unprivileged execution context.

In some embodiments, a method for managing uncacheable memory mappings for an unprivileged execution context is initiated based on allocating memory to an unprivileged execution context. The method maps these memory locations allocated to the unprivileged execution context as uncacheable within one or more first page tables corresponding to a privileged execution context, while mapping the memory locations corresponding to the unprivileged execution context as cacheable within one or more second page tables corresponding to the unprivileged execution context.

By doing so, the method prevents memory of the unprivileged execution context from being speculatively accessed by the privileged execution context. In particular, based at least on the memory locations allocated to the unprivileged execution context being mapped as uncacheable within the one or more first page tables, one or more processors of a computer system cease or otherwise prevent speculative execution of one or more processor instructions executed by the privileged execution context that access any of these memory locations allocated to the unprivileged execution context. This closes the opportunity for the unprivileged execution context to observe side effects that would result if those memory locations had been accessed.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein use "uncacheable" memory mappings to close speculative side channels that could allow an unprivileged execution context to access a privileged execution context's memory. As used herein, an unprivileged execution context can include any execution context that should not have access to the privileged execution context's memory, regardless of its actual privilege level. In particular, after allocating memory to an unprivileged execution context, embodiments map memory locations allocated to this execution context as uncacheable within first page table(s) corresponding to the privileged execution context. However, the embodiments map those same memory locations as "cacheable" within second page table(s) corresponding to the unprivileged execution context.

In general, processors will not carry out a speculative memory access if the access is to uncacheable memory. Thus, the foregoing mappings prevent a processor from carrying out speculative execution of instruction(s) within the privileged execution context, if those instruction(s) access any of the unprivileged execution context's memory (i.e., because this execution context's memory is mapped as uncacheable for the privileged execution context). However, embodiments retain the performance benefits afforded by memory caching for the unprivileged execution context, since the unprivileged execution context's memory is mapped as cacheable for the unprivileged execution context.

Figure 1:
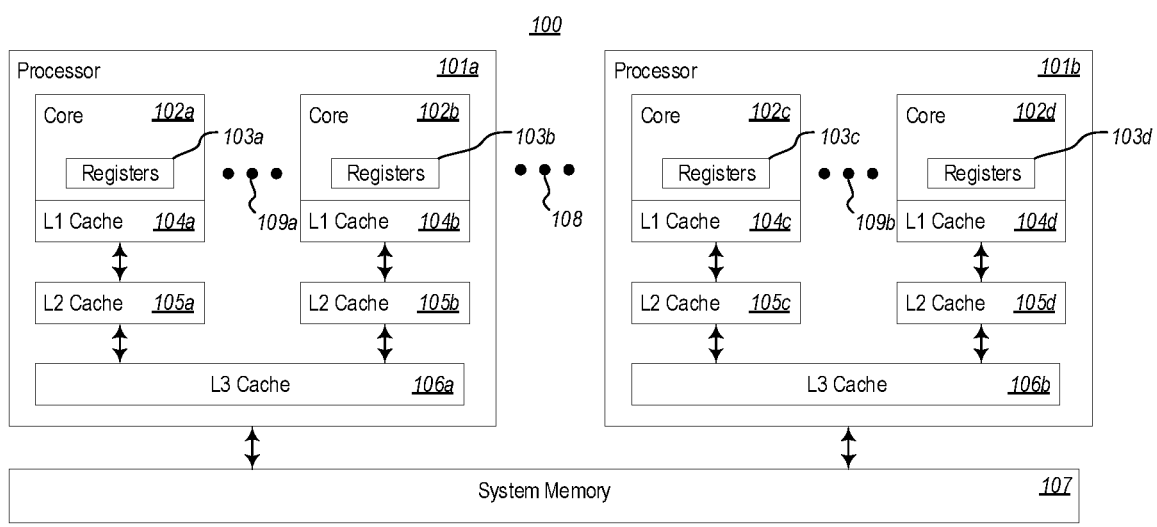
FIG. 1 illustrates an example computer architecture in which embodiments herein may operate.

Initially, to facilitate an understanding of these techniques, FIG. 1 illustrates an example computer architecture 100 that is commonly employed by contemporary computers and computer microprocessors, and in which embodiments herein may operate. In particular, FIG. 1 depicts two microprocessors 101a and 101b (referred to collectively as processor(s) 101), though as indicated by the ellipses 108 the principles described herein operate in environments having any number of processors (i.e., one or more). Each processor 101 is depicted as including two physical processing cores (i.e., cores 102a and 102b in processor 101a, and cores 102c and 102d in processor 101b, referred to collectively as core(s) 102). As indicated by the ellipses 109a/109b, the principles described herein operate in environments in which the processors 101 have any number of cores (i.e., one or more). These cores 102 are responsible for carrying out the primary computational operations of the processors 101, including executing executable instructions of application programs. When architecture 100 includes more than one core (i.e., multiple cores in a single processor and/or multiple processors, architecture 100 is typically referred to as a multiprocessing system.

As shown, each core 102 can include corresponding registers 103a-103d (referred to collectively as registers 103). Registers comprise a (relatively) small amount of volatile memory used by the cores 102, for example, to store temporary values and to track various execution state. Each core 102 typically includes a plurality of individual registers, some used for specific purposes and some used as general-purpose storage. The particular number and type of registers 103 varies depending on processor manufacturer.

FIG. 1 also illustrates varies tiers of memory, including L1 cache memories 104, L2 cache memories 105, L3 cache 106 memories, and system memory 107. In general, system memory 107 is the primary operational memory of a computer system, and is typically volatile random-access memory (RAM), though other types of memories are possible. The size of system memory 107 varies widely depending on the size and capability of the computer system being implemented, and typically ranges from several hundred megabytes to tens of gigabytes (or more) in contemporary computer systems.

The cache memories are smaller memories used by the cores 102 to temporarily cache memory locations from the system memory 107 for quick read/write access. In the depicted architecture 100, each core 102 includes its own corresponding L1 cache 104 (i.e., L1 cache 104a for core 102a, L1 cache 104b for core 104b, etc.). An L1 cache 104 is the cache that is "closest" to the core(s) 102 (an often it is "built in" to the core), and typically has the lowest access speed and latency of all the caches, but also the smallest size. L1 caches typically range in the tens of kilobytes (e.g., 32 KB or 64 KB) in contemporary processors. Each core 102 is also associated an L2 cache 105 (i.e., L2 cache 105a for core 102a, L2 cache 105b for core 104b, etc.). Each L2 cache is typically larger than its corresponding L1 cache, but has a slower access speed and latency than the L1 cache. L2 caches typically range in the hundreds of kilobytes (e.g., 256 KB to 1024 KB) in contemporary processors. While L2 caches have historically been embodied on chips separate from the processors 101, contemporary processors typically include the L2 caches. Each processor 101 may also be associated with an L3 cache 106a (though these are sometimes omitted in contemporary processors). L3 caches typically range in the single-digit megabytes (e.g., 1 MB to 10 MB) in contemporary processors. While L3 caches have historically been embodied on chips separate from the processors 101, contemporary processors typically include the L3 caches. Although not depicted, even higher cache levels (e.g., L4) may also be used.

In general, when a core 102 needs access to data stored at a memory address that is not already cached in its L1 cache 104, a "cache miss" occurs, and that memory address is sought in the L2 cache 105. If it is not in the L2 cache 105, it is sought in the L3 cache 106 (if present), and so on, until it is retrieved from system memory 107. Similarly, if a memory address is "evicted" from the L1 cache 104, and the corresponding data has been modified, that eviction flows through the cache levels until the modified data is written to system memory 107.

Although not depicted, each core 102 may be enabled to carry out multiple "threads" of execution (typically two) at the same time. This is known as simultaneous multithreading (SMT), often referred to as "hyper-threading" (HT). When a processor's 101 core(s) 102 are capable of SMT, that processor 101 presents a multiple of the number of available physical cores as "logical" or "virtual" cores. Thus, for example, if a processor 101 comprises a single physical core 102 capable of SMT that executes two threads at the core, it presents two logical cores, or if it comprises two physical cores 102 capable of SMT that executes two threads at the core, it presents four logical cores.

Multiple logical and/or physical cores 102 may share access to the same memory address at the same time (e.g., an address caches in an L1 cache 104 could be shared by two logical cores at the same physical core 102, and/or it could be cached in multiple L1 caches 104 at the same time). Since these multiple cores 102 may independently perform read and write operations on this shared memory address, modern processors employ cache coherence protocols (CCPs) to synchronize these operations across caches/cache levels to maintain a consistent data state. In general, CCPs maintain state information for each cache line (and potentially in relation to individual cores) and apply rules for synchronizing cache data based on changes in these states. Examples of common contemporary CCPs are MSI (i.e., cache states include modified, shared, and invalid), MESI (i.e., cache states include modified, exclusive, shared, and invalid), and MOESI (i.e., cache states include modified, owned, exclusive, shared, and invalid).

Figure 2:
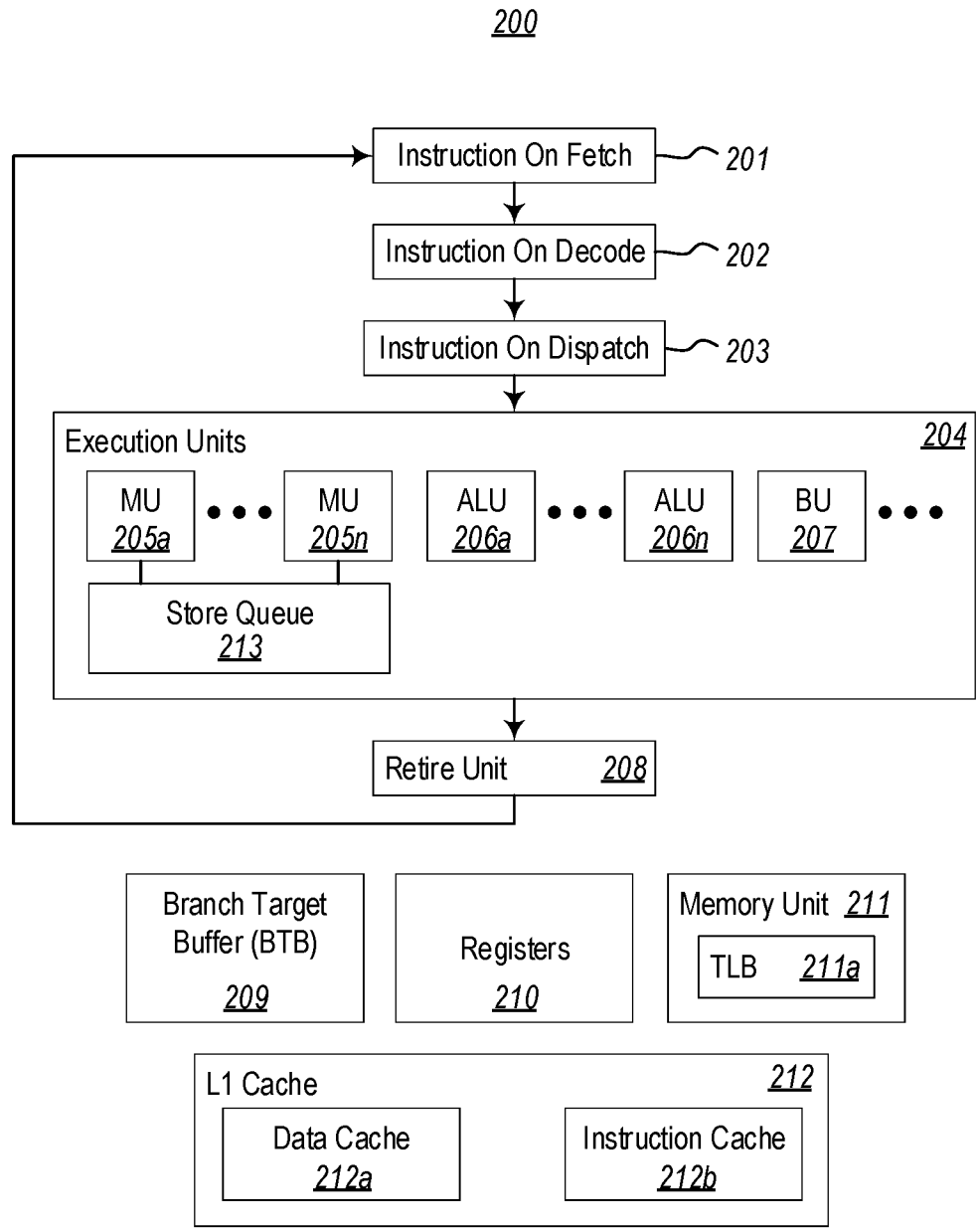
FIG. 2 illustrates an example processor architecture in which embodiments herein may operate.

FIG. 2 illustrates an example processor architecture 200 in which embodiments herein may operate, including some of the components that may be part of a microprocessor (e.g., each physical core 102 of FIG. 1). Initially, each microprocessor may include components to fetch, decode, and dispatch executable instructions for execution (e.g., an instruction fetcher 201, an instruction decoder 202, and an instruction dispatcher 203). As its name signals, the instruction fetcher 201 fetches executable instructions from memory (e.g., from an instruction cache section 212b of its L1 cache 212; if the requested instructions are not in the L1 cache 212, a "cache miss" occurs, and the instructions are requested instructions are obtained from higher-level memory layers). Typically, the instruction fetcher 201 fetches a block of multiple executable instructions at a time. The instruction decoder 202 decodes each fetched instruction, and typically breaks it into a plurality of smaller micro-operations for processing by various execution units 204. The instruction dispatcher 203 then dispatches these micro-operations to the appropriate execution unit 204, which independently perform their respective tasks based on the micro-operations. In contemporary high-performance processors, the instruction dispatcher 203 may dispatch the micro-operations in such a way that their processing is performed in parallel and often out-of-order with respect to the original instructions fetched by the instruction fetcher 201. The instruction dispatcher 203 does so to ensure that the execution units 204 remain as "busy" as practical. Instructions can be executed out-of-order since not all instructions are dependent on outputs from prior-executed instructions.

The particular types of execution units 204 varies from processor to processor, but common execution units include one or more memory units (i.e., MU 205a to 205n), one or more arithmetic logic units (i.e., ALU 206a to 206n), and a branch unit 207. As the number of individual execution units increases, the amount of potential parallelism in processing the micro-operations also increases. The MU's 205 are responsible for interacting with memory (i.e., reading and writing to data in a data cache section 212a of its L1 cache 212; if the requested memory address(es) are not in the L1 cache 212, a "cache miss" occurs, and those memory addresses are obtained from higher-level memory layers). The ALU's 206 are responsible for performing arithmetic operations, such as adding, subtracting, multiplying, dividing, etc. The BU 207 is responsible for making branching/jumping decisions, and carrying out those branches/jumps, using entries in a branch target buffer (BTB) 209.

Using this setup, a processor can continually fill a "pipeline," and execute instructions/micro-operations out-of-order and in parallel in this pipeline. For example, once the instruction dispatcher 203 has dispatched all of the micro-operations for the block of instructions fetched by the instruction fetcher 201 to the execution units 204, the instruction fetcher 201 can fetch a new block of instructions and continue the process.

As the execution units 204 complete the micro-operations, the results of these operations flow into a retire unit 208. Based on these results, the retire unit 208 determines how to ensure that the instructions (fetched by the instruction fetcher 201) complete in the correct order. As depicted, output of the retire unit 208 loops back to the instruction fetcher 201 to communicate appropriate information for ensuring efficient and correct instruction execution.

If a core 102 implements SMT, the instruction fetcher 201, the instruction decoder 202, and the instruction dispatcher 203 are typically "striped" to process multiple streams of instructions (typically two, resulting in two different threads of execution), while the execution units 204 and retire unit 208 process the micro-operations and results for each of these streams.

As an example, consider the stream of instructions shown in Table 1, as fetched by the instruction fetcher 201:

TABLE 1

| ID Instruction | Comment |
|---|---|
| 1. MOV R0 ← 0 | Move the value zero into register R1 |
| 2. ADD R1 ← 0 | Add the value zero to the value register R1, and store the result in register R1 |
| 3. MOV R2 ← 0 | Move the value zero into the register R2 |
| 4. MOV R4 ← (R5) | Move the contents of the memory address stored in register R5 into register R4 |
| 5. ADD R0 ← R0, 1 | Add the value one to the value in register R0, and save the result in register R0 |
| 6. MOV R6 ← (R4) | Move the contents of the memory address stored in register R4 into register R6 |
| 7. ADD R6 ← R1 | Add the values of registers R6 and R1, and place the result in register R6 |
| 8. ADD R1 ← R0, 1 | Add the value one to the value in register R0, and save the result in register R1 |

Instructions 1-3 are all independent ALU operations, and can thus their micro-operation(s) can generally be assigned to three different ALU's 206 for parallel execution. Instruction 5 is a memory operation that is also independent from instructions 1-3, and its micro-operation(s) can thus be assigned to a MU 205 for parallel execution with the micro-operations of instructions 1-3. Instruction 5 relies on the results of instruction 1 as an input, and thus needs to start after instruction 1 completes. However, it does not complete in any particular order with respect to instructions 2-4 or 6-7 (and it can thus be assigned to an ALU 206 for execution in parallel with these instructions). Instruction 6 relies on the results of instruction 4, and must therefore start after it completes, while instruction 7 relies on the results of instructions 2 and 6. Instructions 7 and 8 appear to have a dependency (i.e., register R1), some processors can actually dispatch them in parallel, due to a register file 209.

The instruction fetcher 201 continues to fetch instructions as fast as the pipeline allows, with the goal of keeping the pipeline as full as possible (or practical). However, when the instruction fetcher 201 encounters a branch or conditional load instruction that could lead to two different paths of execution, there may be insufficient information to know which path should be taken (e.g., because due to parallel out-of-order execution of the instructions leading up to the branch, some of the instructions what would provide the needed information have not completed). In these situations, contemporary processors engage in "speculative" execution—i.e., the processor makes a guess as to which branch to take, and begins executing the instructions in that branch. If the retire unit 208 determines that the guess was correct (e.g., based on results from the branch unit 207), the processor has been able to keep the pipeline busy and has made efficient use of its resources. If the retire unit 208 determines that the guess was incorrect, however, any of the work that had been performed on the incorrect branch is discarded (e.g., the execution units 204 stop work on that branch and/or the retire unit 208 ignores the results; and any slots in the register file 209 that were used for the speculative execution are freed up) and execution on the alternate branch is commenced.

Thus, when conducting "speculative" execution and a misprediction is made, the retire unit 208 ensures that the external architectural result is correct because it does not commit any results unless they should be committed. However, even though the results of mispredicted execution are not committed/discarded, the processor has performed some work, and the side effects of this work having been performed can be used to infer what some of that work was.

Some instructions must be committed in-order. For example, any instruction/operation that writes to a memory location cannot be committed until the retire unit 208 determines that it should actually have executed. This is because committing a write to a memory location has side-effect(s) that go beyond the register file 209. In order to facilitate performing speculative work on these types of instructions/operations, some processors associate the MU's 205 with a store queue 213 that queues memory operations that are ready to be pushed out to memory until the retire unit 208 determines if those operations should actually be committed.

Other processors may stall these write operations within the MU's 205, themselves. Processors often operate on the concept of "the oldest operation in the machine." As the instruction fetcher 201 fetches instructions, it may tag them with an identifier (e.g., sequence number) that is used to track its micro-operations as they flow through the pipeline. The retire unit 208 can only "retire" an instruction when it is the oldest one in the pipeline (e.g., based on using these identifiers). If an MU 205 stalls a write operation, it may hold it until the MU 205 determines that the operation is the "oldest instruction in the machine" prior to releasing it.

Contemporary processors also include a memory unit 211. Memory units 211 are typically responsible for controlling the flow of data between the registers 210, the caches (e.g., L1-L3), and system memory 107. They also typically employ virtual addressing in order to create memory spaces that do not correspond to the physical layout of system memory 107, and that are frequently larger than the system memory 107 itself. Thus, the memory unit 211 provides translations between physical addresses in system memory 107, and virtual addresses. This is typically performed though use of page tables (stored in system memory 107) that map virtual addresses to physical addresses.

Page tables typically operate based on deconstructing a virtual address into a page table index that is used to locate an appropriate logical/virtual to physical address mapping. Page tables can also define access rights and other attributes (e.g., read only, read/write, etc.) for different addresses. Often times, page tables are multi-layered (e.g., multilevel, hierarchical, nested, etc.). One common multi-layered schema, for instance, maintains several tables that each covers a certain block of virtual memory (e.g., each table may be 4 KB, and contain 1024-entries to cover a 4 MB "page" of virtual memory). These smaller tables are then linked together by a root or master page table, effectively creating a tree data structure. In this schema, a virtual address could be deconstructed into three parts (i) the index in the root page table, the index in a lower-level page table, and the offset in that page to the particular virtual memory address. While this schema uses two levels, page table structures could use more than two. When multi-layered schemas are used, there may be attributes (e.g., read only, read/write, uncacheable, etc.) for each lower-level table (or branch of tables), with those attributes applying to each address in the "page" defined by the table (or branch).

The process of the memory unit 211 locating a logical/virtual to physical address mapping is known as a "page table walk" and is a relatively expensive operation (e.g., in terms of processing time/CPU cycles it takes to complete). As such, memory units 211 typically employ a translation lookaside buffer (TLB) 211*a* that stores recently located virtual to physical address translations, along with attributes (e.g., permissions, read/write attributes, etc.) of those addresses.

As part of speculative execution of operations that read from or write to memory, a MU 205 typically performs a TLB lookup for the appropriate address(es). If the proper mapping does not appear in the TLB, the MU 205 then typically initiates a page table walk. If the proper mapping does not appear in the page table, an exception (page fault) is raised, and the MU 205 may stall on the operation until the retire unit 208 instructions it to commit the operation. However, these speculative table walks may be an avenue for speculatively-executed operations to affect external state (i.e., because the page table is stored in system memory 107).

In particular, some processors store attributes in the page table that provide information about whether a translation entry has been accessed. For example, each translation entry may be associated with an "accessed" flag and a "dirty" attribute (e.g., flag). In some implementations, an "accessed" flag is generally set when a table walk is performed in connection with a read operation, and a "dirty" flag is generally set when a table walk is performed in connection with a write operation. Different processor manufactures handle these flags in different ways when a page walk is performed due to a speculatively-executed operation. In some architectures, these flags cannot be affected by speculative operations. In other architectures, the "accessed" flags can be affected by speculative operations, but the "dirty" flags cannot. If speculative execution of an operation would cause a flag to change on a table walk, an MU 205 may stall the operation and hold it (e.g., until it is the oldest operation in the machine). If the table walk would not cause a flag change (i.e., because the entry was already flagged as accessed and/or dirty, the MU 205 may continue speculative processing of the operation (i.e., continuing the table walk and populating the TLB 211*a*).

If a virtual to physical address translation is located when performing speculative execution of a memory operation, the MU 205 may proceed to probe the data cache 212*a* for the memory address. This could cause a "cache miss" to occur to bring the data through the memory hierarchy and fill the data cache 212*a*. This could also involve additional data movement through various caches due the CCP. The MU 205 might then proceed with memory operations (e.g., proceed with reads, or potentially store writes to the store queue 213).

To summarize the foregoing, when performing speculative execution of a memory-related operation, a MU 205 might (1) identify a virtual to physical address mapping. This causes a TLB lookup, and potentially a page walk. The end result could be an exception (which could stall the operation), a need to change a page table flag to proceed (which could stall the operation), or an address translation. If an address translation is obtained, the MU 205 might (2) proceed to probe and fill the cache and potentially perform a read. If the operation is a write, the MU 205 might (3) stall or store the write to the store queue 213. While steps (1) and (2) may get held up (but often do a substantial amount of processing), step (3) is the only one that is guaranteed to get held up (i.e., the write will never be committed to memory until it is determined that it was correctly predicted).

Speculative side channel attacks arise from the fact that the operations performed in steps (1) and (2) change state (e.g., TLB 211a entries and data cache 212a entries) and take measurable amounts of time (i.e., wall clock time and processor cycles) to perform. An attacker can, therefore, use timing information to infer some of what was performed by speculatively-executed instructions in privileged code. For example, using timing information, an attacker can infer whether the speculatively executed instruction had a hit in the TLB 211a, whether it caused a page walk, whether it did a probe and fill in the data cache 212a, etc.

Furthermore, it is possible to cause instruction sequences appearing after a branch or conditional jump in privileged code to execute speculatively, even if they were never intended to execute. If these instruction sequences include memory operations, the side-effects of those memory operations cause side effects (i.e., cache and TLB changes) that are not architecturally visible (i.e., an attacker may not be able to actually see cache and TLB changes), but that are still observable through inference and experimentation. At times, these side effects may be sufficient for an attacker to identify data values, memory addresses, and even memory contents accessed by privileged code.

One way in which an attacker can cause certain instruction sequences in privileged code to execute is to "prime" the BTB 209. In general, a BTB 209 includes a plurality of entries, each mapping the virtual address of a branch instruction with the virtual address of an instruction that is predicted to be the target of the branch instruction. These entries are continually updated as code executes, based on prediction algorithms employed by the BU 207. These algorithms can vary, but in general the more often a given address in executed code is the correct target of a particular branch instruction, the more likely it is that the algorithm will place an entry mapping the address of the particular branch instruction to that given address in the BTB 209. Notably, a BTB 209 is generally shared by all threads executing at a given processor, and it may not identify which thread caused the contents of a particular entry to be set, or otherwise differentiate between virtual memory spaces. Thus, an attacker may be able to craft and execute first code within their own execution context, which when executed likely causes entries to appear in the BTB 209 that will result not only in a branch misprediction when second code that the attacker does not have control of is later executed within another execution context, but in the misprediction also causing particular portions of this second code that are designated by the attacker to be speculatively executed within the other execution context.

For example, suppose that privileged code executing in a privileged security context includes (e.g., at virtual address 0xFFC within a privileged memory space) a jump to an address stored in memory (e.g. a destination address stored in a memory location pointed to by a register). This privileged code could be, for example, kernel code executing within kernel mode, code executing within a higher privileged virtual machine, etc. In order to optimize execution of this instruction, the BU 207 may consult the BTB 209 to determine if a destination address has been predicted, and use that predicted address for the jump so the processor does not need to go to memory to find it. Thus, the processor may begin speculative execution at this destination address. Suppose also that the privileged code includes (e.g., at address 0xDEF) a function that is intended to be executed after the jump, as well as other code (e.g., at address 0xABC) that should never be the target of the jump—but that includes memory operation(s) that an attacker may wish to have speculatively executed within the privileged context in order to observe their side effects.

In order to trigger execution of the privileged code at address 0xABC within the privileged security context, the attacker might repeatedly execute unprivileged code within an unprivileged security context. This unprivileged code can include a branch or jump instruction at virtual address 0xFFC, and which has an instruction at virtual address 0xABC as its proper target. This unprivileged code could be, for example, code executing as part of a user-mode process, code executing as part of a lower privileged virtual machine, etc. As such, these instructions would be in reference to code in an unprivileged memory space (e.g., the virtual memory space of a user-mode process, a memory space designated by a hypervisor to a guest virtual machine, etc.). Nonetheless, by repeatedly executing this branch/jump instruction within the unprivileged context at the same processor that executes the privileged code, the attacker may be able to cause the processor's BTB 209 to include an entry mapping source address 0xFFC to destination address 0xABC. As discussed above, the BTB 209 typically doesn't differentiate between threads/memory spaces. Thus, when the privileged code's jump instruction is encountered during execution within the privileged context, the BU 207 may begin speculative execution at address 0xABC within the privileged memory space-rather than its proper address 0xDEF—as is desired by the attacker.

It may be particularly useful for an attacker if the triggered speculative execution within the privileged context speculatively accesses memory allocated to the attacker's unprivileged context. Thus, an attacker may choose code (e.g., at address 0xABC, in the example above) which performs memory operation(s) that access memory allocated to the attacker's unprivileged context. This is because, after the privileged code speculatively accesses the attacker's memory space, the attacker may then be able to access memory from its own memory space and determine if any of that memory was cached (e.g., in L3 cache 106 or other cache level(s)) during the privileged code's speculative execution (i.e., there is a cache hit when the attacker accesses memory from the unprivileged memory space). Once the attacker determines which memory was accessed by the privileged code, he may be able to use this knowledge to infer what the privileged code was doing (i.e., by measuring the side-effects of the accesses to that memory), and ultimately may be able to gain the contents of privileged memory contents.

The inventors have recognized that such attacks can be mitigated by exclusively executing privileged code at a given processing unit, and executing unprivileged code at other processing unit(s), since unprivileged code is then unable to prime the BTB 209 used by privileged code. However, this may be an unacceptable solution, since it may be a waste of processor resources, since the processor assigned exclusively to privileged code may be underutilized. For example, it may not be practical to execute only kernel-mode code at one processor while executing user-mode code at other processor(s), or to devote one processor to a host virtual machine, while using other processor(s) for guest virtual machines.

As such, the inventors have created an alternate solution, which also prevents such attacks-even when privileged and unprivileged code execute at the same processor. In particular, this solution is built upon the observation by the inventors that many processors support being able to designate portions (e.g., one or more pages) of memory as being "uncacheable." As the word implies, any memory that is designated as uncacheable cannot be cached within the processor's cache hierarchy (e.g., L1-L3 caches). Rather, when an MU 205a needs the contents of uncacheable memory, it obtains those contents directly from system memory 103, without obtaining it from or storing it in the cache hierarchy.

Another property of uncacheable memory is that, in most processors, an MU 205a will not execute a memory operation speculatively if that operation accesses a memory location that is designated as uncacheable. The inventors have recognized that this second property—in which a processor typically does not speculatively execute instructions that access uncacheable memory—is usable to effectively and efficiently address speculative side channel vulnerabilities, such as those that rely on priming a BTB 209.

In particular, embodiments include maintaining page table(s) for use by the privileged security context(s), and using page table attributes to map memory for any unprivileged context(s) as uncacheable in these page table(s). Separate page table(s) are also maintained for use by the unprivileged context(s); however, these page table(s) map this same memory as being cacheable. Thus, even if an unprivileged context is able to trigger a privileged context to execute instructions speculatively (e.g., through priming the BTB 209), the page table(s) for the privileged context map the unprivileged context's memory as uncacheable, so any speculative instructions that would access the uncacheable memory from the unprivileged context are not actually executed. The unprivileged context, however, uses page table(s) that map the same memory as cacheable, so it retains the full performance benefits of memory caching when accessing this memory itself.

Figure 3:
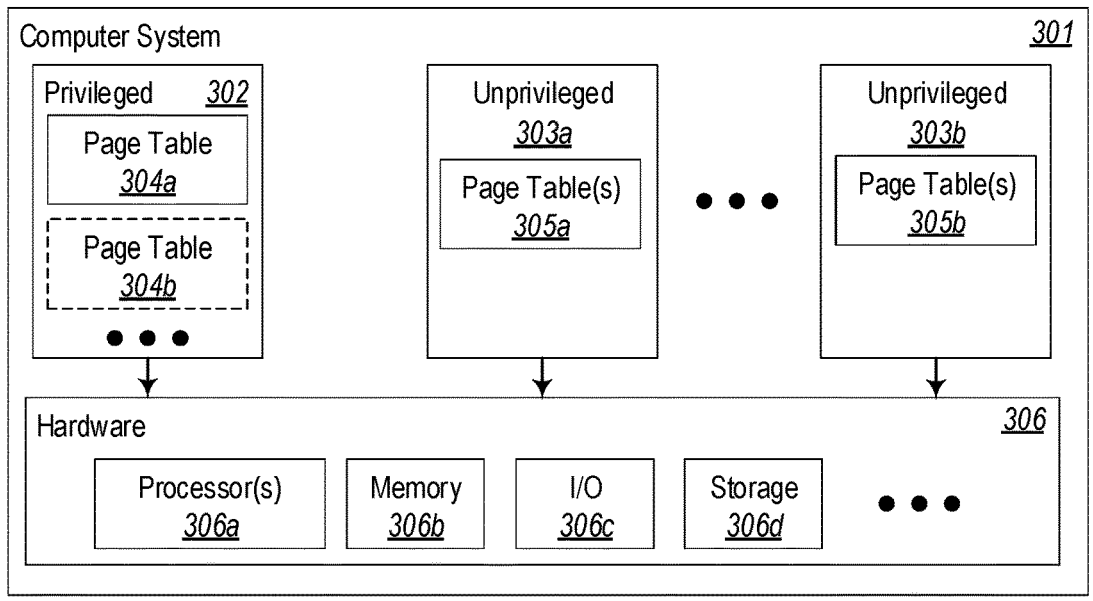
FIG. 3 illustrates an example computing environment for mitigating speculative side channel attacks.

In order to facilitate an understanding of these concepts, FIG. 3 illustrates an example computing environment 300 for mitigating speculative side channel attacks, by managing uncacheable memory mappings for an unprivileged execution context. In particular, computing environment 300 includes a computer system 301 comprising computer hardware 306, such as one or more processor(s) 306a, memory 306b (e.g., RAM), one or more input/output device(s) 306c, one or more storage device(s) 306, etc. Using hardware 306, the computer system 301 executes a privileged execution context 302 and one or more unprivileged execution context(s) 303 (e.g., the depicted unprivileged contexts 303a and 330b).

As used herein, the privileged execution context 302 and the unprivileged execution context(s) 303 represent any situation in which the processor(s) 306a may transition between execution of a first context and a second "differently privileged" context that should not be able to access memory allocated to the first context. For example, as alluded to above, the privileged execution context 302 could comprise one or more kernel-mode processes, and each unprivileged execution context 303 could comprise one or more user-mode processes. Thus, a state transition could, for example, comprise a thread within a user-mode processes making a kernel-mode Application Programming Interface (API) call). As is generally recognized, in most systems user-mode process(es) should not normally have access to kernel-mode memory. In another example, the privileged execution context 302 could comprise a higher privileged virtual machine (an example of which is sometimes referred to as a "host" virtual machine), and each unprivileged execution context 303 could comprise a lower privileged virtual machine (an example of which is sometimes referred to as a "guest" virtual machine). As is generally recognized, in most systems guest virtual machine(s) should not normally have access to memory allocated to the host virtual machine.

While the examples above focus on situations in which the privileged and unprivileged execution contexts have different overall privilege levels within computer system 301 (i.e., kernel mode versus user mode, and host versus guest virtual machine), embodiments can also include situations in which the privileged execution context 302 and the unprivileged execution context(s) 303 actually might have similar general overall privilege levels within the computer system 301, but are "differently privileged" since one context should not have access to memory of the other context. For example, the privileged execution context 302 could comprise a first user-mode process and the unprivileged execution context 303a could comprise a second user-mode process. In this situation, the first user-mode process is considered "privileged" because the second user-mode process should not have access to memory allocated to the first user-mode process. As another example, the privileged execution context 302 could comprise a first guest virtual machine and the unprivileged execution context 303a could comprise a second guest virtual machine. In this situation, the first guest virtual machine is considered "privileged" because the second guest virtual machine should not have access to memory allocated to the first guest virtual machine. Thus, throughout this specification and claims, the terms "privileged execution context" and "unprivileged execution context" are broadly interpretable to include these situations in which a privileged execution context is privileged relative to an unprivileged execution context because it has memory that the unprivileged execution context should not be able to access, regardless of other privileges granted by computer system 301.

In order to mitigate against speculative side channel attacks by the unprivileged execution context(s) 303 that could reveal memory of the privileged execution context 302, computing environment 300 maintains memory page table(s) 304 for the privileged execution context 302 that are distinct from memory page table(s) 305 maintained for the unprivileged execution context(s) 303. For example, based on memory being allocated to the unprivileged execution context 303a (e.g., by initiation of a user-mode process or a guest virtual machine), the computer system 301 may update attributes in a page table (e.g., page table 304a) of the privileged execution context 302 to map the memory of the unprivileged execution context 303a as uncacheable. At the same time, the computer system 301 may update attributes in a page table (e.g., page table 305a) of the unprivileged execution context 303a to map the same memory as cacheable.

Figure 4:
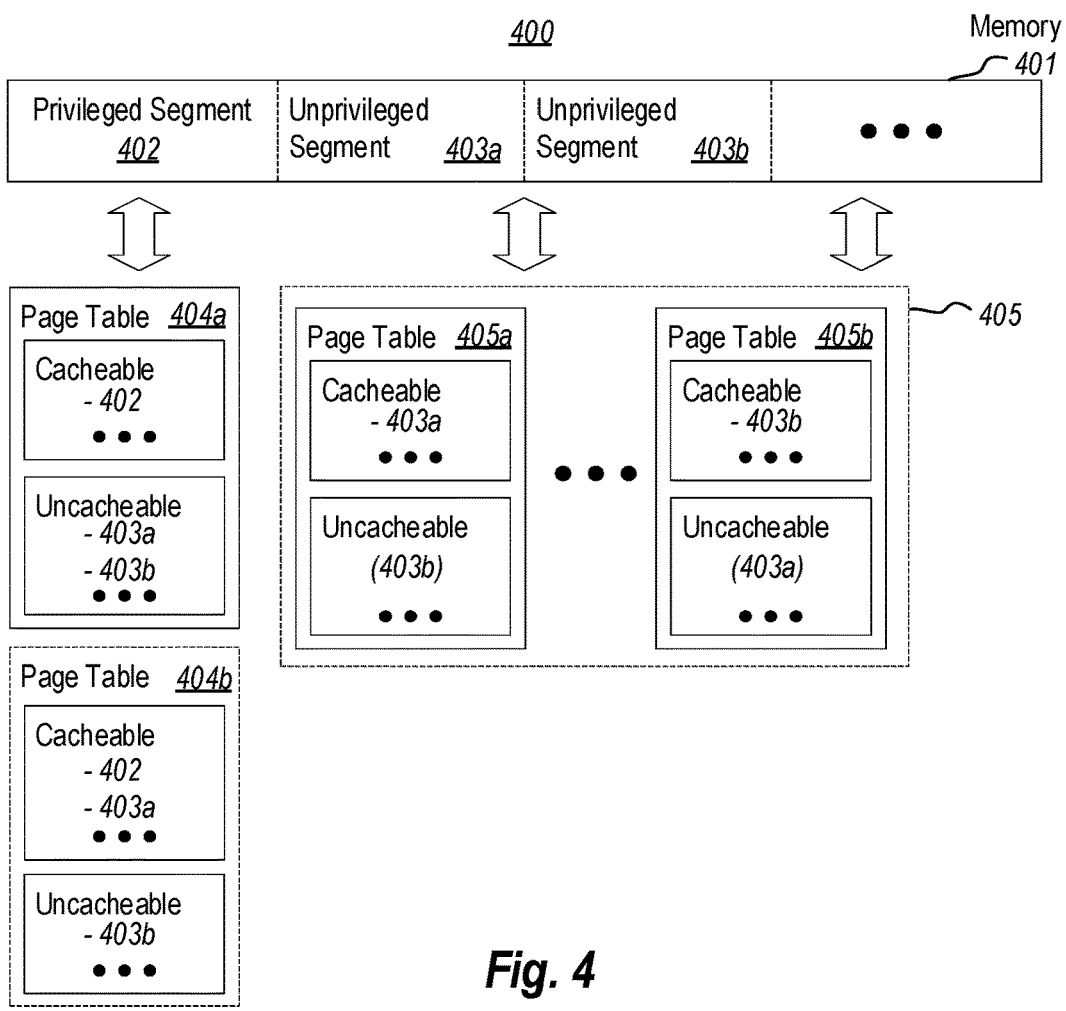
FIG. 4 illustrates example memory page table mappings.

FIG. 4 illustrates example memory page table mappings 400 for the privileged execution context 302 and the unprivileged execution context(s) 303. In particular, FIG. 4 symbolically depicts physical memory 401 as including segments allocated to the privileged execution context 302 (i.e., privileged segment 402) and the unprivileged execution contexts 303 (i.e., unprivileged segments 403a/403b). This depiction is symbolic, as it will be appreciated that the segments are depicted as being contiguous, but in most modern computer systems they would actually typically be non-contiguous. Physical memory addresses in these segments are mapped to logical (i.e., virtual) addresses in page tables 405/405.

FIG. 4 illustrates a page table 404a (e.g., corresponding to page table 304a) for the privileged execution context 302. As shown, this page table 404a maps the privileged execution context's own privileged segment 402 as being cacheable, but maps the unprivileged segments 403a/403b as being uncacheable. The page tables 405a/405b (e.g., corresponding to page tables 305a/304b) for the unprivileged execution contexts 303a/303b, however, map each context's unprivileged segments 403a/403b as being cacheable for the respective segment. These mappings can be made, for example, based on changing an attribute (e.g., setting or clearing an appropriate flag) in the page table data structures. Note that while, for simplicity, FIG. 4 shows the entirety of each segment as being mapped as cacheable or uncacheable, it may be that only portion(s) of the segments may be mapped (e.g., only a subset of memory pages in the segment). Also note that the ellipses throughout the page tables indicate that they can have mappings other than those shown.

These mappings have at least two beneficial effects. First, since page table 404a maps the unprivileged segments 403a/403b as being uncacheable, the processors(s) 306a will not carry out any memory access(es) made by speculative instructions that are part of the privileged execution context 302. This means that, even if an attacker within an unprivileged execution context 303 is able to trigger speculative execution by the processors(s) 306a of such instructions (e.g., by priming a BTB 209), those instructions will not actually be executed-avoiding the side channel vulnerability. Second, since page tables 405a/405b map each unprivileged execution context's respective segment being cacheable, the processors(s) 306a will (i) still cache any memory accesses made by an unprivileged execution context to its own memory segment, and (ii) still carry out speculative execution that involves that memory on behalf of the unprivileged execution context. Thus, execution performance of the unprivileged execution contexts 303 is substantially unaffected.

FIG. 3 depicts each unprivileged execution context 303 as having its own page table(s) 305. However, some implementations may maintain a single set of page tables for a plurality of unprivileged execution contexts. This is depicted in FIG. 4 by box 405, which encompasses page table 405a for unprivileged execution context 303a and page table 405b for unprivileged execution context 303b. Additionally, while, for clarity, FIGS. 3 and 4 depict each page table as a single box, it will be appreciated that a single page table can comprise a dynamic data structure comprising many parts, such as a hierarchical data structure comprising a different levels of page tables, as discussed above.

Some embodiments may also map memory of one unprivileged execution context as uncacheable for another unprivileged execution context. For example, as shown using parentheticals, some embodiments may map unprivileged segment 403b as uncacheable in page table 405a, and/or map unprivileged segment 403a as uncacheable in page table 405b. In the same way that side channel attacks by an unprivileged execution context are mitigated by mapping the unprivileged context's memory as uncacheable for a privileged execution context, mapping memory as uncacheable within unprivileged execution contexts can also mitigate side channel attacks between unprivileged execution contexts. For example, mapping unprivileged segment 403b as uncacheable in page table 405a can mitigate side channel attacks against unprivileged execution context 303a by unprivileged execution context 303b. This is because, even if unprivileged execution context 303b could cause unprivileged execution context 303a to executed instructions speculatively (e.g., by priming an BTB 209), the unprivileged execution context 303a would not speculatively access any of unprivileged execution context's 303b memory.

At times, it may be desirable for a privileged execution context to be able to (at least temporarily) map an unprivileged execution context's memory as cacheable. For example, there may be situations (discussed later) in which it is appropriate for unprivileged execution context 303a to request that privileged execution context 302 perform operation(s) on its behalf, in which those operation(s) would benefit from being cached at the privileged execution context 302. In these situations, embodiments may temporarily map unprivileged segment 403a as cacheable for the privileged execution context 302. This is shown in page table 404b of FIG. 4 (e.g., corresponding to page table 340b of FIG. 3).

Such temporary mappings may be made by changing the appropriate attributes in a page table (e.g., flags in appropriate entries of page table 304a/404a may be modified to create page table 304b/404b, and then be reverted to their prior state after the requested operation(s) have completed to revert back to page table 304a/404a). However, in order to make such temporary mappings efficient, some embodiments may instead maintain a "pool" of parallel page tables, and then switch between the page tables-rather than modifying contents. For example, computer system may include both page table 304a/404a which maps unprivileged execution context's 303a memory a uncacheable, and page table 304b/404b which maps unprivileged execution context's 303a memory a cacheable. Then, when the unprivileged execution context 303a makes a request of privileged execution context 302 that would warrant a temporary change in mappings, the computer system 301 can change which page table is being referenced (e.g., pointed to) as the "active" page table.

Since page tables may comprise hierarchical data structures, some embodiments may be able to maintain parallel versions of only portions/subsets of these data structures, and then reference the appropriate portion(s)/subset(s) as being currently active. For example, rather than maintaining parallel versions of the entire hierarchical data structure, embodiments may only maintain parallel versions of branch (es) within the structure that are relevant to the unprivileged segment 304a. Then, to temporarily change the cacheable/uncacheable mappings, the hierarchical data structure may be modified to reference the appropriate branch(es) as being currently active.

In some embodiments, when cacheable/uncacheable mappings are temporarily changed, they are changed for only a single processor (among plural processors) for which the change is relevant (i.e., the processor that is executing privileged execution context 302 and unprivileged execution context 303a). That way, any other processor(s) that might already have portions of unprivileged segment 303a cached would not need to evict those portion(s) or otherwise update their CCP to reflect the change. In some embodiments, during the time in which these page table mappings are temporarily changed, any of these other processors(s) that still have the page table entries mapped as cacheable are expressly restricted (e.g., by a kernel, hypervisor, etc.) from executing the unprivileged execution context. In additional, or alternative, embodiments any processor that shares a lower-level of the cache hierarchy (e.g., L1 and/or L2 caches) may be expressly restricted executing the unprivileged execution context.

In some embodiments, each change of reference to active page tables and/or page table portions is performed as an atomic operation. Doing so can permit these reference changes to occur without any locking protections. In some embodiments, such atomic operations could comprise compare-and-swap (CAS) operations. In general, a CAS—as an atomic operation—compares the contents of a memory location with a given value and, only if they are the same, modifies the contents of that memory location to a new given value. Various mechanisms exist for doing a CAS, such as the WINDOWS InterlockedCompareExchangePointer( ) API function, the x86 cmpxchg opcode, the x86_64 cmpxchgq opcode, and the like.

As part of changing the mappings back to cacheable after the privileged execution context has completed a request for the unprivileged execution context, where an embodiment allows one or more of the unprivileged memory mappings to remain as cacheable, some embodiments expressly flush cache for predetermined portions (or all) of the unprivileged memory mapping that remained mapped as cacheable, while not expressly flushing the cache for unprivileged memory mappings that were remapped as uncacheable.

As part of changing the mappings from cacheable to uncacheable, some embodiments expressly flush the cache for memory that has now become uncacheable from the processor that was handling the request (e.g., from the processor's TLB 211a and its L1/L2 cache, for example). In some processor cache architectures, this may ensure that the most recent values written are visible when they are accessed as uncacheable memory. For instance, embodiments may identify memory page(s) belonging to the unprivileged context that have now become uncacheable, and instruct the processor to flush all addresses within those memory page(s).

Figure 5:
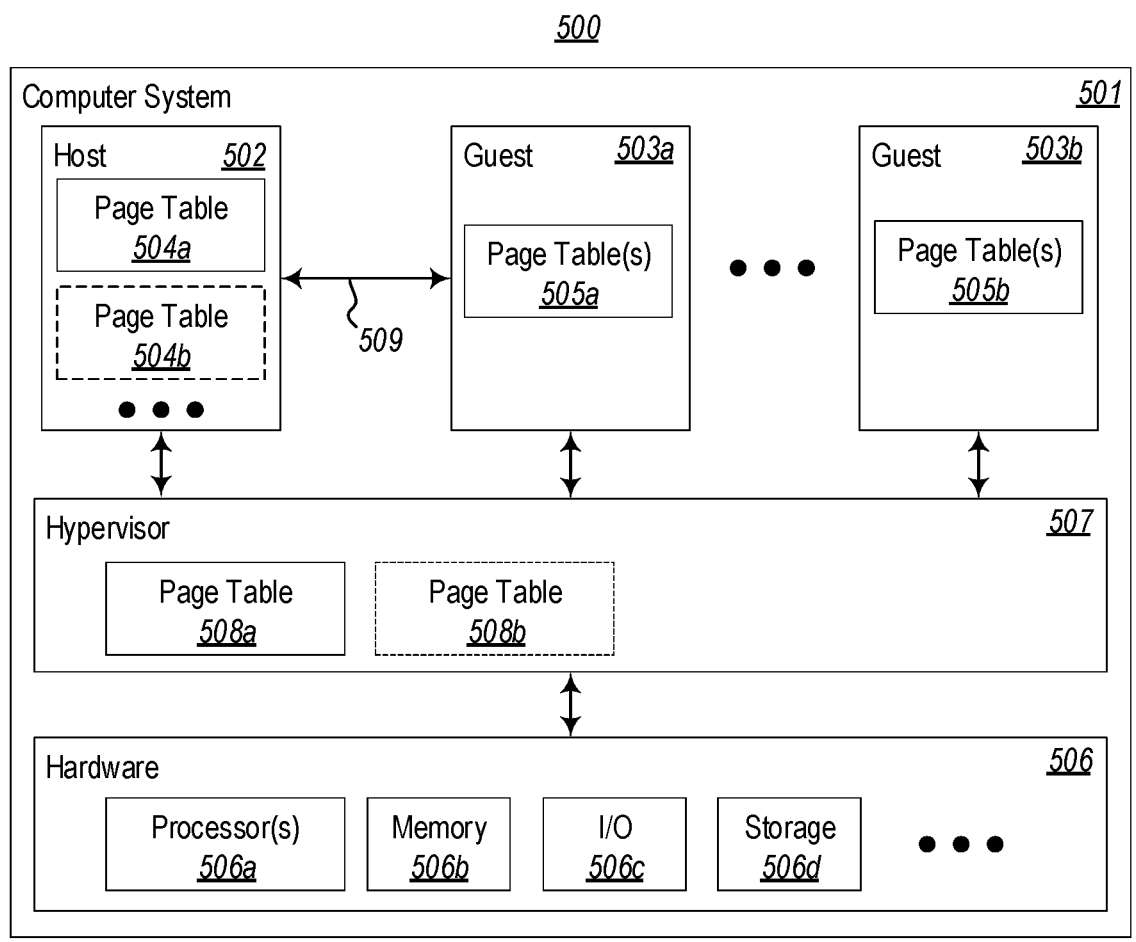
FIG. 5 illustrates a virtualization environment for mitigating speculative side channel attacks.

In view of the foregoing general principles, FIG. 5 illustrates more particular example comprising a virtualization environment 500 for mitigating speculative side channel attacks. In FIG. 5, individual elements generally correspond to like-numbered elements in FIG. 3. Thus, for example, computer system 501 (e.g., computer system 301) executes a first "host" virtual machine (e.g., privileged execution context 302) and a plurality of second "guest" virtual machines 503 (e.g., unprivileged execution contexts 303) using its hardware 506 (e.g., hardware 306). Unlike computer system 301, however, computer system 501 includes a hypervisor 507 that provides an abstraction between the virtual machines 502/503 and the physical hardware 506. While FIG. 5 makes reference to host and guest virtual machines, it will be appreciated that the principles described herein are applicable to virtualization environments that use different terminology, and even in virtualization environments that lack a higher-privileged "management" virtual machine that would be analogous to a host virtual machine. For example, as mentioned above embodiments could be applicable to two (or more) similarly-privileged virtual machines, and in which at least one virtual machine should not have access memory of to another.

Similar to FIG. 3, FIG. 5 includes page tables 504 for the host virtual machine 502 and separate page table(s) 505 for the guest virtual machine(s) 503. These page tables are used—in the manner described in connection with FIGS. 3 and 4—to prevent the host virtual machine 502 from speculatively accessing memory allocated to the guest virtual machine(s) 503, based on mapping the memory allocated to the guest virtual machine(s) 503 as uncacheable in the page tables 504 of the host virtual machine 502 at appropriate times.

FIG. 5 illustrates an example in which it may be appropriate for a privileged execution context to execute operation(s) on behalf of an unprivileged execution context. In particular, FIG. 5 includes an arrow 509 indicating a request from a guest virtual machine 403 (guest 503a, in this case) to the host virtual machine 502. In virtualization environment 500, such requests may be made in order to request that the host virtual machine 502 perform one or more input/output (I/O) operation(s) on behalf of the guest virtual machine 503a (i.e., using I/O devices 506c). Such a request may be made in virtualization environment 500 because the guest virtual machine 503a does not have access to the physical hardware 506 (due to hypervisor 507), but the hypervisor 507 grants the host virtual machine 502 an elevated level of access to the physical hardware 506. Thus, based on request 509, the host virtual machine 502 may temporarily map at least a portion of guest virtual machine's 503a memory as cacheable (as represented by page table 504b) while it performs these I/O operations on behalf of guest virtual machine 503a. Notably, during the time that the host virtual machine 502 uses page table 504b, care may be taken to restrict the speculative execution that can be performed on behalf of the host virtual machine 502, in order to limit the opportunity for the guest virtual machine 503a to use this window to perform speculative side channel attacks. For example, care could be taken to avoid use of any instructions that rely on indirect branches (e.g., a branch that uses as a target an address that is stored in memory), which would reference the BTB 209.

Note that FIG. 5 also shows page tables 508 at the hypervisor. In general, the hypervisor's page tables 508 are "second level" page tables that map between logical or virtual physical addresses that are seen by the virtual machines 502/503 to actual physical memory addresses in memory 506b. The page tables 504/505 for the virtual machines 502/503, in turn, use these logical/virtual physical addresses as if they were actual physical addresses when mapping more classic virtual addresses to physical addresses. Some embodiments may operate to use these second level page tables 508 to manage "uncacheable" mappings for the host virtual machine 502, in addition to, or as an alternative to page tables 504.

In view of the environments of FIG. 1-5, FIG. 6 illustrates a flowchart of an example method 600 for managing uncacheable memory mappings for an unprivileged execution context. As will be appreciated in view of the foregoing disclosure, method 600 is usable to mitigate against speculative side channel attacks between different security contexts, such as processes, virtual machines, etc.

Figure 6:
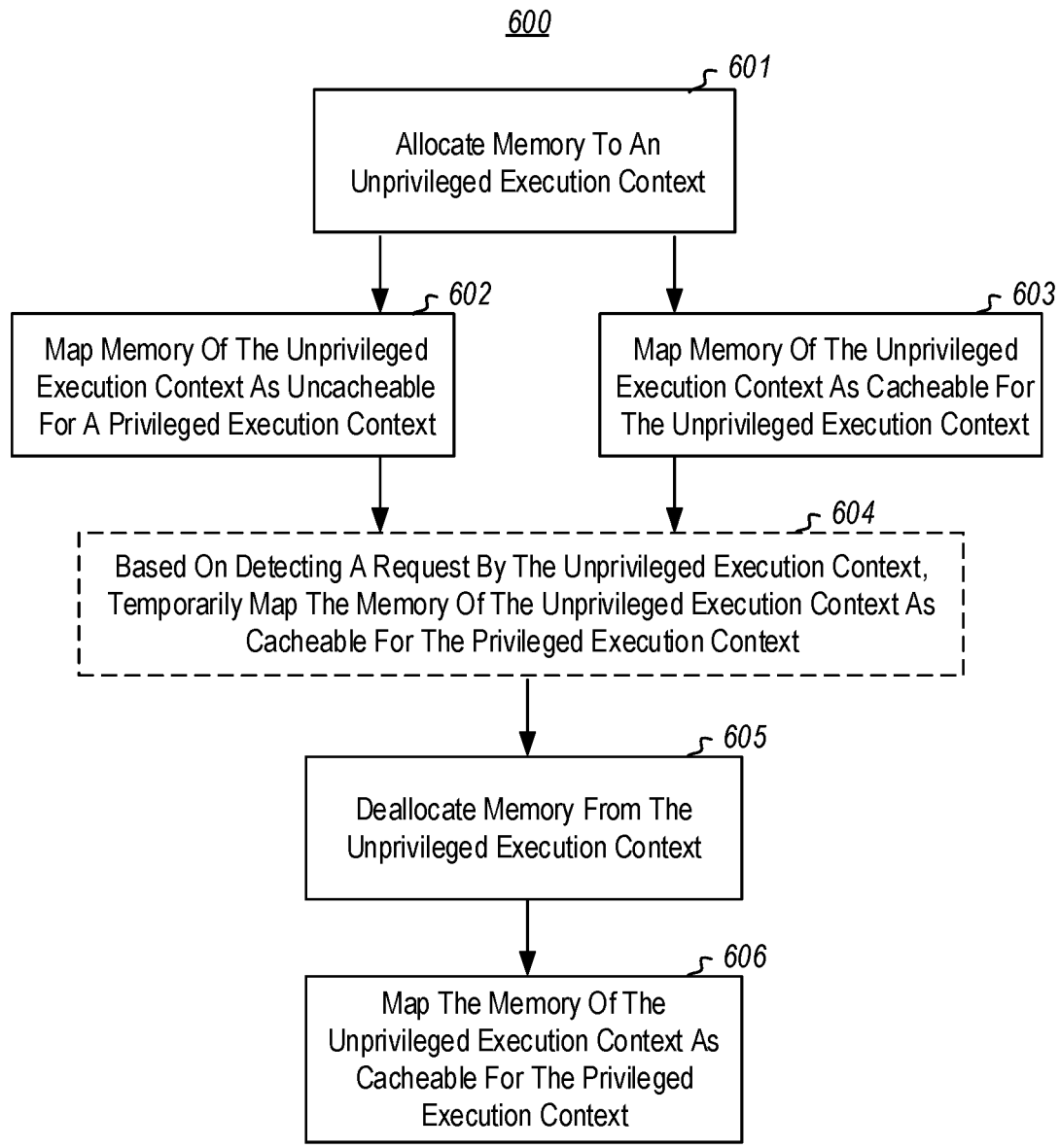
FIG. 6 illustrates a flowchart of an example method for managing uncacheable memory mappings for an unprivileged execution context.

As shown FIG. 6 includes, or is at least triggered based upon, an act 601 of allocating memory to an unprivileged execution context. For example, act 601 may include allocating memory to a user-mode process, a guest virtual machine, or some other unprivileged execution context, include mapping logical (virtual) addresses to physical addresses in appropriate page tables. In reference to FIG. 3 this could be allocating memory to an unprivileged execution context 303a, or in reference to FIG. 5 this could be allocating memory to a guest virtual machine 503a (e.g., due to their instantiation or due to their increased memory use).

FIG. 6 also includes an act 602 of mapping memory of the unprivileged execution context as uncacheable for a privileged execution context. In some embodiments act 602 comprises, based at least on allocation of the memory locations to the unprivileged execution context, mapping the memory locations allocated to the unprivileged execution context as uncacheable within one or more first page tables corresponding to a privileged execution context. For example, based on allocation of one or more memory locations (e.g., unprivileged segment 403a) to the unprivileged execution context 303a, computer system 301 may map, in page table 304a/404a, physical addresses from this unprivileged segment 403a of memory to logical (virtual) addresses, and use attributes in the page table(s) to indicate that these addresses are uncacheable. As a more specific example, based on allocation to memory to guest virtual machine 503a, computer system 501 may map all, or part, of the virtual machine's memory as uncacheable in page table 504a and/or page table 508a.

FIG. 6 also includes an act 603 of mapping memory of the unprivileged execution context as cacheable for the unprivileged execution context. In some embodiments act 603 comprises, based at least on the memory allocation, mapping the memory locations allocated to the unprivileged execution context as cacheable within one or more second page tables corresponding to the unprivileged execution context. For example, based on allocating the unprivileged segment 403a of memory to the unprivileged execution context 303a, computer system 301 may map, in page table 305a/405a, physical addresses from this unprivileged segment 403a of memory to logical (virtual) addresses, and use attributes in the page table(s) to indicate that these addresses are cacheable. As a more specific example, based on allocating memory to the guest virtual machine 503a, computer system 501 may map all, or part, of the virtual machine's memory as cacheable in page table 505a.

Thus, based on acts 602 and 603, embodiments may result in different page tables that have at least one identical logical (virtual) to physical address mapping, but in which the attributes in one page table maps those addresses as cacheable, and the other page table maps those addresses as uncacheable. For example, page table 304a/404a may include logical (virtual) to physical address mappings relevant to unprivileged execution context 303a, and whose attributes indicate these addresses are uncacheable, as well as page tables 305a/405a that include these same logical (virtual) to physical address mappings, but whose attributes indicate these addresses are cacheable.

FIG. 6 shows no specific ordering between acts 602 and 603. Thus, these acts could be performed any order with respect to each other, including being performed in parallel.

As depicted in broken lines, FIG. 6 may also include an act 604 of, based on detecting a request by the unprivileged execution context, temporarily mapping the memory of the unprivileged execution context as cacheable for the privileged execution context. In some embodiments act 604 comprises detecting a request from the unprivileged execution context to the privileged execution context and then, based on the request, temporarily mapping the memory locations allocated to the unprivileged execution context as cacheable within the one or more first page tables while the privileged execution context processes the request. For example, as was explained earlier, the unprivileged execution context 303a might request that the privileged execution context 302a perform one or more operations—such as I/O operations—on its behalf. In this situation, the unprivileged execution context's 303a memory might temporarily be mapped as cacheable for the privileged execution context 302a. This is represented by page table 304b/404b. As a more specific example, FIG. 5 shows a request 509 from the guest virtual machine 503a to the host virtual machine 502, such as a request that the host virtual machine 502 interact with I/O hardware 506c on its behalf. As such, the host virtual machine 502 might temporarily use page table 504b (and/or page table 508b), which maps the guest virtual machine's 503a memory as cacheable.

As discussed, use of table 304b/404b/504b could involve changing a pointer/reference to an alternate/parallel page table or page table portion. As such, act 604 could include changing one or more of a reference to an active page table, or a reference to an active page table portion. As was also discussed, to reduce interruptions caused by the change, this could be done for a single processor that executes the subject execution contexts/virtual machines.

FIG. 6 also includes, or at least operates in response to, an act 605 of deallocating memory from the unprivileged execution context. For example, act 605 may include closing a user-mode process, shutting down a guest virtual machine, or removing some other unprivileged execution context. Alternatively, it could include deallocating some memory from one of the forgoing (e.g., due to decreased memory use). In reference to FIG. 3 this could be removal of unprivileged execution context 303a, or in reference to FIG. 5 this could be removal of guest virtual machine 503a, as examples.

FIG. 6 also includes an act 606 of mapping the memory of the unprivileged execution context as cacheable for the privileged execution context. In some embodiments act 606 comprises, based at least on deallocating memory locations from the unprivileged execution context, mapping the memory locations as cacheable within the one or more first page tables corresponding to a privileged execution context. For example, based on removal of unprivileged execution context 303a computer system 301 could map that context's memory as cacheable for the privileged execution context 302 (e.g., similar to page table 304b), or based on removal of guest virtual machine 503a computer system 501 could map that virtual machine's memory as cacheable for the host virtual machine 502 (e.g., similar to page table 504b).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for managing uncacheable memory mappings for differently privileged execution contexts, the method comprising:
    based at least on allocating memory locations to a second execution context: mapping the memory locations corresponding to the second execution context as uncacheable within one or more first page tables corresponding to a differently privileged first execution context; and mapping the memory locations corresponding to the second execution context as cacheable within one or more second page tables corresponding to the second execution context, wherein, based at least on the memory locations allocated to the second execution context being mapped as uncacheable within the one or more first page tables, the one or more processors cease speculative execution of one or more processor instructions executed by the first execution context that access any of the memory locations allocated to the second execution context; and based at least on deallocating the memory locations from the second execution context, mapping the memory locations as cacheable within the one or more first page tables corresponding to the first execution context.

2. The method as recited in claim 1, wherein the first execution context comprises a first virtual machine, and the second execution context comprises a second virtual machine.

3. The method as recited in claim 2, wherein the one or more first page tables are maintained by at least one of a host virtual machine or a hypervisor, the maintaining the one or more first page tables comprising: ensuring the one or more first page tables map memory locations as uncacheable based on the memory locations also being allocated to the second execution context.

4. The method as recited in claim 1, further comprising: detecting a request from the second execution context to the first execution context; and based on the request, temporarily mapping the memory locations allocated to the second execution context as cacheable within the one or more first page tables while the first execution context processes the request.

5. The method as recited in claim 4, wherein temporarily mapping the memory locations allocated to the second execution context as cacheable within the one or more first page tables comprises changing one or more of a reference to an active page table or a reference to an active page table portion.

6. The method as recited in claim 4, wherein temporarily mapping the memory locations allocated to the second execution context as cacheable within the one or more first page tables comprises temporarily mapping the memory locations allocated to the second execution context as cacheable for only one of a plurality of processors.

7. The method as recited in claim 4, wherein the request comprises an input/output request from a guest virtual machine to a host virtual machine.

8. The method as recited in claim 1, wherein the first execution context comprises a kernel mode process, and the second execution context comprises a user mode process.

9. A computer system, comprising:
one or more processors; and one or more hardware storage devices having stored thereon computer-executable instructions that are executable by the one or more processors to cause the computer system to perform at least the following, based at least on allocating memory locations to differently privileged execution contexts: map the memory locations allocated to a second execution context as uncacheable within one or more first page tables corresponding to a differently privileged first execution context; map the memory locations allocated to the second execution context as cacheable within one or more second page tables corresponding to the second execution context; and based at least on the memory locations allocated to the second execution context being mapped as uncacheable within the one or more first page tables, prevent one or more speculative memory accesses by the one or more processors based on one or more processor instructions that (i) are executed by the first execution context, and (ii) access any of the memory locations allocated to the second execution context; and based at least on deallocation of the memory locations from the second execution context, map the memory locations as cacheable within the one or more first page tables corresponding to the first execution context.

10. The computer system of claim 9, wherein the first execution context comprises a first virtual machine, and the second execution context comprises a second virtual machine.

11. The computer system of claim 10, wherein the one or more first page tables are maintained by at least one of a host virtual machine or a hypervisor, the maintaining the one or more first page tables comprising: ensuring the one or more first page tables map memory locations as uncacheable based on the memory locations also being allocated to the second execution context.

12. The computer system of claim 9, the computer-executable instructions also being executable to cause the computer system to:
detect a request from the second execution context to the first execution context; and based on the request, temporarily map the memory locations allocated to the second execution context as cacheable within the one or more first page tables while the first execution context processes the request.

13. The computer system of claim 12, wherein temporarily mapping the memory locations allocated to the second execution context as cacheable within the one or more first page tables comprises changing one or more of a reference to an active page table or a reference to an active page table portion.

14. The computer system of claim 12, wherein temporarily mapping the memory locations allocated to the second execution context as cacheable within the one or more first page tables comprises temporarily mapping the memory locations allocated to the second execution context as cacheable for only one of a plurality of processors.

15. The computer system of claim 12, wherein the request comprises an input request or an output request from a guest virtual machine to a host virtual machine.

16. The computer system of claim 9, wherein the first execution context comprises a kernel mode process, and the second execution context comprises a user mode process.

17. A computer program product comprising one or more hardware storage devices having stored thereon computer-executable instructions that are executable by one or more processors to cause a computer system to perform at least the following:
based at least on allocation of memory locations to a second execution context:
map the memory locations allocated to the second execution context as uncacheable within one or more first page tables corresponding to a differently privileged first execution context; and map the memory locations allocated to the second execution context as cacheable within one or more second page tables corresponding to the second execution context; and based at least on the memory locations allocated to the second execution context being mapped as uncacheable within the one or more first page tables, prevent speculative execution of one or more memory accesses for the first execution context when the one or more memory accesses target any of the memory locations allocated to the second execution context; and based at least on deallocating of the memory locations from the second execution context, mapping the memory locations as cacheable within the one or more first page tables corresponding to the first execution context.

\* \* \* \* \*